United States Patent [19]

Hutchison et al.

[11] Patent Number: 5,096,032
[45] Date of Patent: Mar. 17, 1992

[54] COMBINED PARK BRAKE AND SHIFT LEVER

[75] Inventors: Wayne R. Hutchison, Mayville, Wis.; Steven C. Wasson, Midland, Mich.

[73] Assignee: Deere & Company, Moline, Ill.

[21] Appl. No.: 715,534

[22] Filed: Jun. 14, 1991

[51] Int. Cl.⁵ .............................................. B60K 41/26
[52] U.S. Cl. .................... 192/4 A; 74/483 R; 192/4 R
[58] Field of Search ............... 192/4 R, 4 A; 56/11.1; 74/473 P, 483 R

[56] References Cited

U.S. PATENT DOCUMENTS

| | | | |
|---|---|---|---|
| 3,710,904 | 1/1973 | Boyer et al. | 192/4 A |
| 3,757,604 | 9/1973 | Schroeder | 74/529 |
| 3,780,839 | 12/1973 | Schroeder | 192/4 A |
| 4,004,665 | 1/1977 | Guhl et al. | 192/4 A |
| 4,037,695 | 7/1977 | Welck | 192/13 R |
| 4,096,930 | 6/1978 | Viscardi | 192/4 A |
| 4,228,879 | 10/1980 | Woodbury | 192/4 A |
| 4,248,331 | 2/1981 | Behrens | 192/13 R |
| 4,296,846 | 10/1981 | Benson | 192/4 A |
| 4,298,108 | 11/1981 | Hutchison | 192/13 R |
| 4,496,035 | 1/1985 | Wanie | 192/4 C |
| 4,759,417 | 7/1988 | Wanie et al. | 180/6.34 |
| 4,844,227 | 7/1989 | Crawford et al. | 192/3.54 |

OTHER PUBLICATIONS

John Deere Horicon Works, Parts Catalog entitled: "RX63, RX 73, RX 75, SX75, RX95, SX95 Riding Mowers" published in the United States in Jan. 1989, pp. 50-6, 50-7 and 50-8.
John Deere Horicon Works, Parts Catalog entitled: "STX30 and STX38 Lawn Tractors", published in the United States in Aug. 1989, pp. 50-6 and 50-7.

Primary Examiner—Rodney H. Bonck

[57] ABSTRACT

A mechanism for use with a vehicle having a power source and a transmission coupled with the power source. A shift lever coupled with the transmission is shiftable in a first direction within a first slot for selectively shifting the transmission between a neutral mode and driving modes. The shift lever is shiftable in a second direction within a second slot for blocking a brake mechanism in an engaged mode. An abutment mechanism is formed in a brake linkage and is abuttable with a portion of the shift lever when the shift lever has shifted into the second slot for blocking the brake linkage and brake mechanism from shifting into the disengaged mode.

15 Claims, 3 Drawing Sheets

COMBINED PARK BRAKE AND SHIFT LEVER

BACKGROUND OF THE INVENTION

1. Field of the Invention

The invention relates to parking brake mechanisms.

2. Description of the Related Art

It is known to provide powered vehicles such as lawn and garden tractors with parking brake mechanisms. One type of parking brake mechanism provides a control that the operator must engage while depressing a brake pedal. A linkage coupled with the control will then act to block or prevent the brake pedal mechanism from returning to an unbraked position, and the vehicle thereby assumes a parked mode. Many such mechanisms require relatively numerous parts and are therefore relatively costly to manufacture and assemble.

Many such parking mechanisms do not prevent the vehicle from being shifted into a parking mode when the vehicle is being driven, or do not prevent the vehicle from being shifted into a driven mode when the parking brake is actuated. Prior art mechanisms that do accomplish these preventive functions often require separate linkage mechanisms that are relatively complex and require a large number of parts, thereby undesirably increasing the cost to manufacture and assemble the vehicle.

Therefore, it would be desirable to provide a vehicle such as a lawn and garden tractor with a parking brake feature that requires a relatively low number of parts. It would be desirable for such a mechanism to prevent the vehicle from being shifted into a driven mode when the brake mechanism is blocked in an engaged or parked mode, and to prevent the brake from being shifted to the parked mode when the vehicle is in a driving mode.

SUMMARY OF THE INVENTION

A mechanism is provided for blocking a brake in an engaged position to thereby place the vehicle in a parked mode. A shift lever is shiftable in a first direction within a first slot to shift the vehicle transmission between neutral and driving modes. A brake pedal is provided that is engagable to slow or stop the vehicle during operation. The motion of the brake pedal is transmitted to a conventional brake via a brake rod linkage. The brake rod has an offset portion formed therein for engagement with a laterally extending portion of the shift lever to block the brake rod in a brake engaged position. To block the brake in the parked mode the operator fully depresses the brake pedal and then pivots the shift lever laterally within a second slot. The laterally extending portion of the shift lever thereby shifts upwardly into blocking abutment with the offset portion of the brake rod. The brake rod is thereby prevented from returning to the brake released mode, and the vehicle assumes a parked mode. The second slot joins the portion of the first slot associated with the shift lever's neutral position, such that the vehicle transmission is shifted to the neutral mode before the parking brake feature can be actuated. Similarly, the parking mode is released as the operator pivots the shift lever to the neutral mode, such that the transmission is prevented from shifting to a driven mode when the parking mode is engaged.

DESCRIPTION OF THE PREFERRED EMBODIMENT

Figure 1:
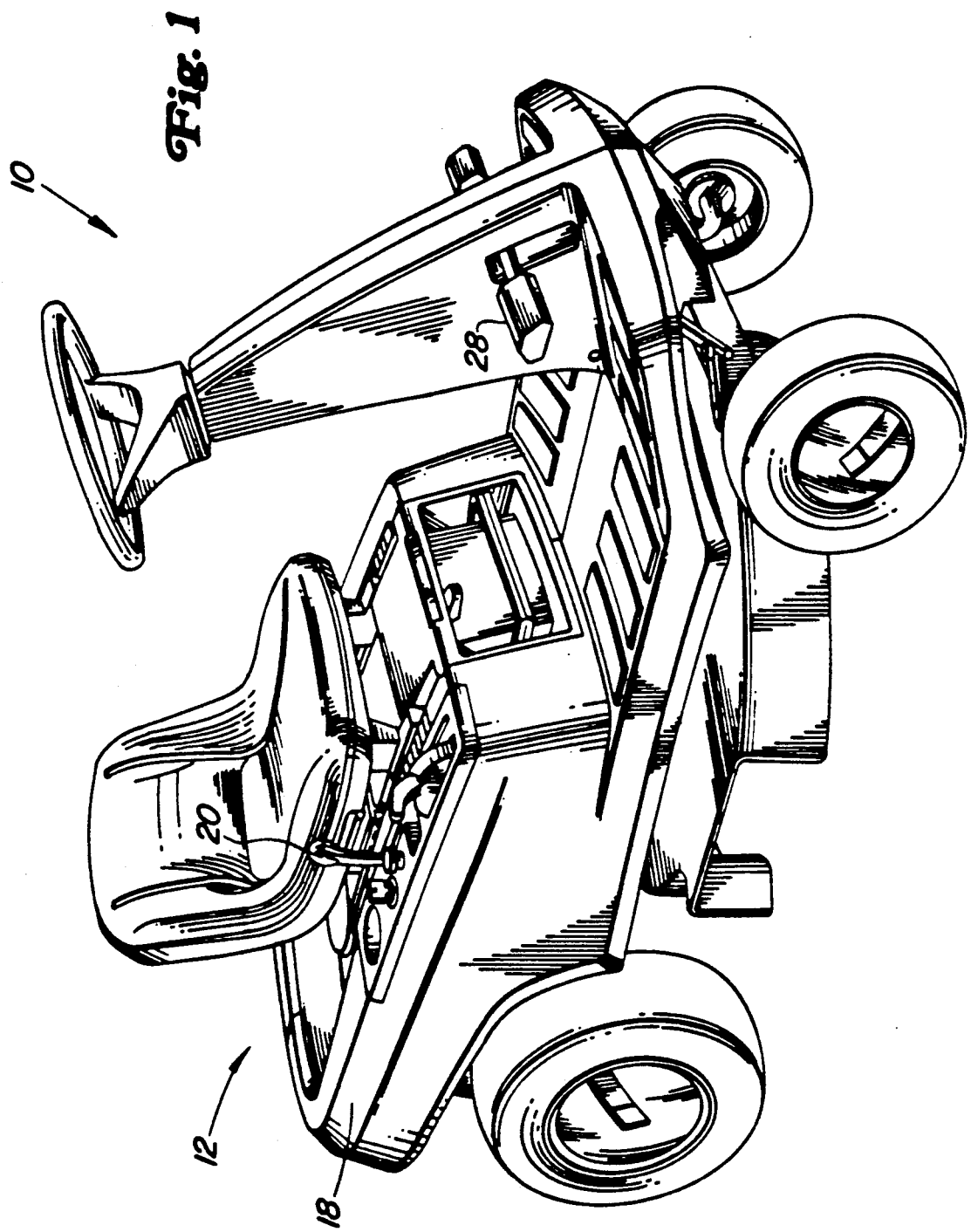
FIG. 1 shows a vehicle with which the preferred embodiment of the present invention may be used.

Referring now to FIG. 1, there is shown a vehicle 10 with which the preferred embodiment of the present invention may be used. The vehicle 10 includes a mechanism for driving the vehicle. A power source 12 such as an internal combustion engine is provided A transmission means 14 having neutral and driving modes is also provided. As better seen in FIG. 2, a pivotal coupling 16 carried by the frame 18 of the vehicle 10 supports a shift lever 20 for pivotal motion in the longitudinal and transverse directions. The shift lever 20 is coupled with the transmission means 14 via a transmission linkage or rod 22, and can be manipulated by the operator to shift the transmission means 14 between the neutral and driving modes. The speed of the vehicle 10 can thereby be varied. A quadrant 24 having a first guide means or first slot means 26 is provided for guiding the shift lever 20 as the shift lever 20 pivots between the neutral and driving modes.

A mechanism is also provided for slowing or stopping the vehicle 10 during operation. A brake control or brake pedal 28 is operatively coupled with a brake linkage or brake rod 30 that is coupled with a conventional brake means 32 at the rear portion of the vehicle 10. As the operator depresses the brake pedal 28 with his foot, the brake linkage 30 pivots a brake mechanism input lever 34, and the brake mechanism 32 is thereby applied to slow or stop the vehicle 10.

A mechanism is provided for blocking the brake mechanism 32 in an engaged or parked mode. An abutment means or offset portion 36 is formed in the brake rod 30. The shift lever 20 includes a laterally extending portion 38 that pivots upwardly as the shift lever 20 pivots laterally within a second guide means or second slot means 40. A third guide means or slot means 42 formed integral with the vehicle frame 18 guides the laterally extending portion 38 during vertical shifting. When the brake pedal 28 is fully depressed the laterally extending portion 38 is upwardly shiftable into abutting relation with the offset portion 36 of the brake rod 30. The laterally extending portion 38 thereby blocks the brake rod 30 from returning to its disengaged position, and the vehicle brake 32 remains applied.

Figure 4:
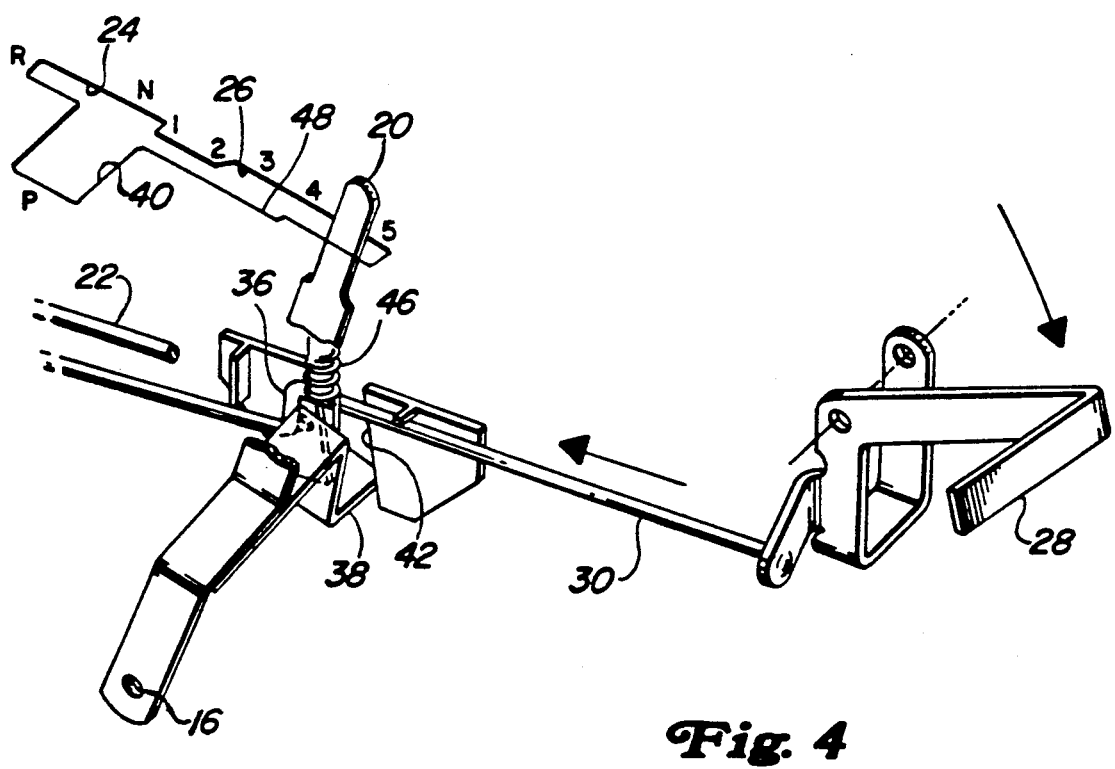
FIG. 4 illustrates the present invention with the shift lever in a forward drive mode and the brake pedal depressed or engaged.

Next, the operation of the preferred embodiment will be discussed. During normal operation of the vehicle 10, the operator may selectively pivot the shift lever 20 longitudinally to thereby shift the transmission 14 between a reverse mode, a neutral mode, and a plurality of forward driving modes. The position of the shift lever 20 within the first slot 26 corresponds to a respective transmission mode. The operator thereby pivots the shift lever 20 longitudinally to control the speed and direction of the vehicle 10. FIG. 4 illustrates the shift lever 20 in a position within the first slot 26 corresponding to a driving mode.

To slow or stop vehicle movement, the operator may depress the brake pedal 28 with his foot. Engagement of the brake pedal 28 shifts the brake rod 30 thereattached toward the rear of the vehicle 10. By shifting rearwardly, the rod 30 shifts a brake input lever 34 rearwardly to engage the vehicle brake 32. FIG. 4 illustrates the brake pedal 28 being depressed while the shift lever 20 is in a driving mode.

Figure 2:
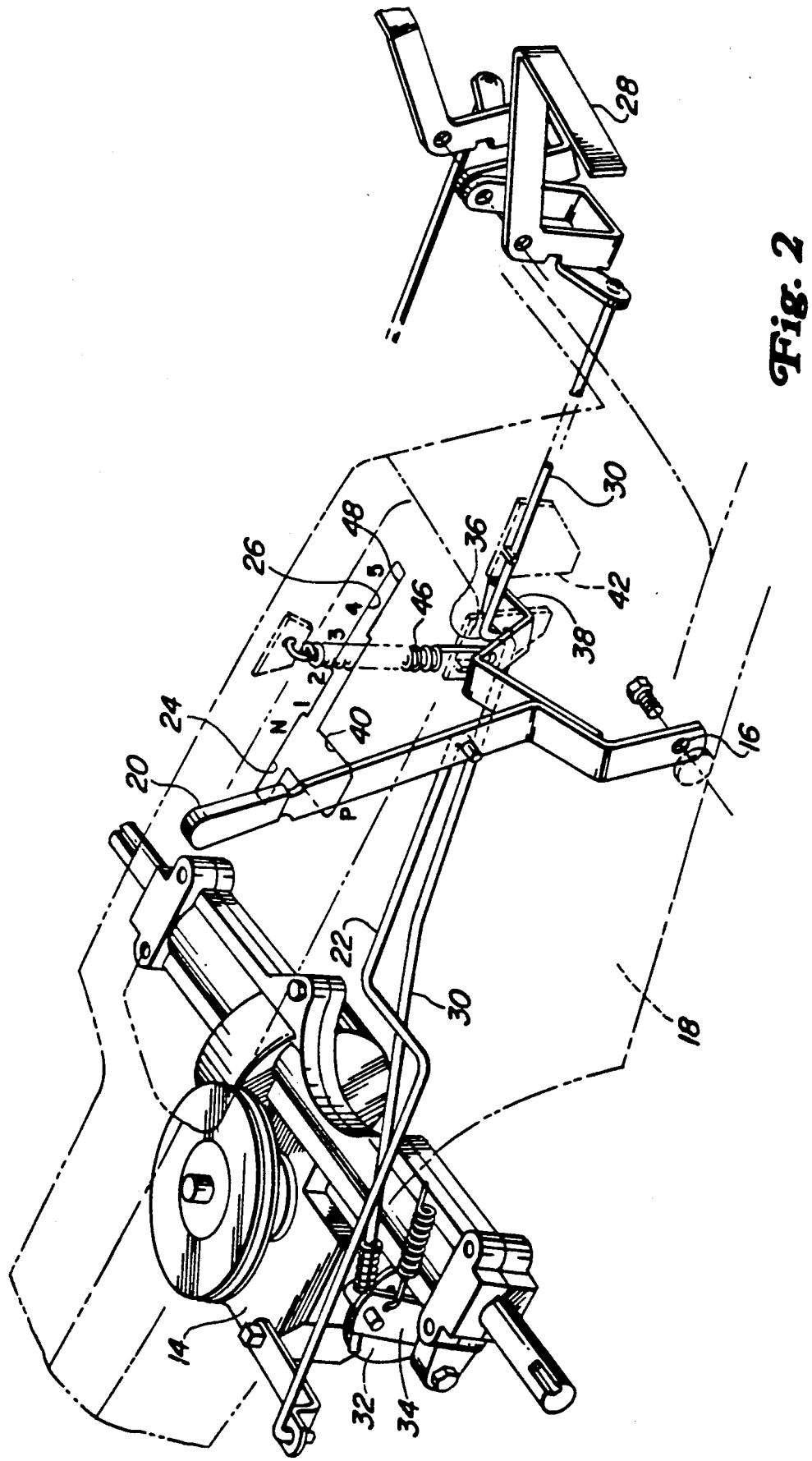
FIG. 2 illustrates the preferred embodiment of the present invention within the vehicle frame, and is shown with the parking brake engaged.

The operator may also desire to place the vehicle 10 in a parked mode, as shown in FIG. 2. To do so, the operator must pivot the shift lever 20 to its neutral position, and then fully depress the brake pedal 28 to shift the brake rod 30 rearwardly. As the brake rod 30 shifts rearwardly, the offset portion 36 formed therein will shift rearwardly beyond the laterally extending portion 38 of the shift lever 20. The laterally extending portion 38 then has clearance to shift upwardly within the third slot 42. Spring 46 acts to bias the shift lever 20 to pivot laterally, thereby swinging the shift lever 20 outwardly into the second slot 40 and the laterally extending portion 38 upwardly into abutting relation with the offset portion 36 of the brake rod 30. Once the laterally extending portion 38 has shifted vertically it serves to block or prevent the brake rod 30 from shifting forwardly. The brake 32 is therefore secured in an engaged or parked mode.

To release the vehicle 10 from the parked mode the operator depresses the brake pedal 28 and pivots the shift lever 20 inwardly along the second slot 40. The laterally extending portion 38 shifts downwardly to allow the brake rod 30 clearance to shift forwardly again. The operator may then release the brake pedal 28 to disengage the vehicle brake 32.

The preferred embodiment of the present invention acts to prevent the vehicle 10 from being shifted into a driving mode when the brake 32 is in a parked mode. The second slot 40 is in intersecting communication with the first slot 26 at the shift lever's neutral position. In order for the vehicle 10 to be shifted to a driven mode from the parking mode, the shift lever 20 must first be shifted within the second slot 40 to the neutral position. Once the shift lever 20 has pivoted to the neutral position the laterally extending portion 38 will have shifted sufficiently downwardly to allow clearance for the offset portion 36 and brake rod 30 to shift forwardly. The brake rod 30 can therefore shift forwardly to disengage the brake 32, and the operator can then pivot the shift lever 20 to the desired driving mode. Since the parking mode becomes disengaged when the shift lever 20 pivots to the neutral position, and the quadrant requires the shift lever 20 to be pivoted to the neutral position before being shifted to the driving modes, the vehicle 10 is prevented from shifting to a driving mode when the brake is in the parked mode.

The preferred embodiment also prevents the brake 32 from assuming the parked mode while the vehicle 10 is in a driving mode. The shift lever 20 pivots fore and aft within the longitudinally extending first slot 26 to shift the transmission 14 between the various driving modes. The shift lever 20 is pivotable laterally within the second slot 40 to place the vehicle 10 in the parked mode. The edge 48 of the first slot 26 acts to block the shift lever 20 from pivoting laterally when the shift lever 20 is in a position other than neutral. Therefore, the operator is prevented from shifting the vehicle 10 into the parked mode when the vehicle 10 is in a driving mode.

Since the configuration of the first and second slots 26 and 40 act to block the shift lever 20 from shifting laterally when in a driving mode, the need for a separate mechanism or linkage for preventing the vehicle 10 from being shifted into a park mode when the transmission 14 is in a driving mode is eliminated. The number of parts and the cost of manufacture and assembly of the preferred embodiment is thereby reduced.

Figure 3:
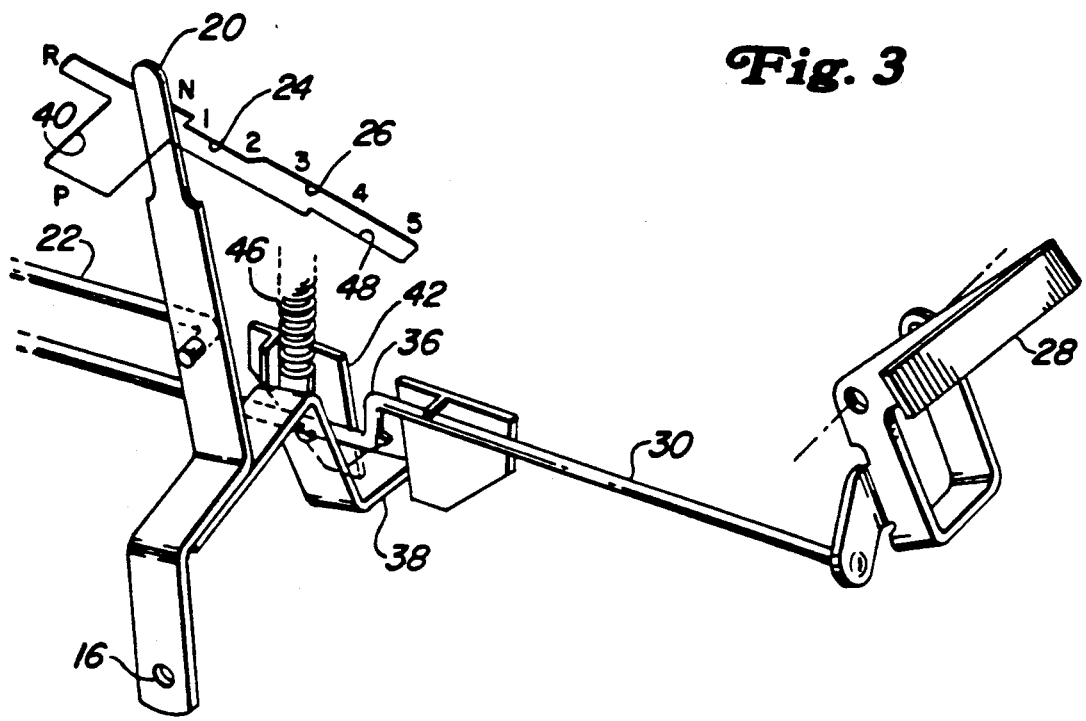
FIG. 3 illustrates the present invention with the brake pedal disengaged and the shift lever in the neutral position.

The preferred embodiment allows the operator to engage the brake pedal 28 when the shift lever 20 is in the neutral position without blocking the brake 32 in a parked mode. When the shift lever 20 is in the neutral position and the brake pedal 28 is not depressed, as shown in FIG. 3, the laterally extending portion 38 of the shift lever 20 engages the lower surface of the rear portion of the brake rod 30. As the operator depresses the brake pedal 28 through an initial range of motion to slow the vehicle 10, the brake rod 30 and offset portion 36 shift rearwardly, and the rear portion of the brake rod 30 slides rearwardly in abutment with the laterally extending portion 38 of the shift lever 20. The rear portion of the brake rod 30 acts to block the laterally extending portion 38 from pivoting upwardly under the bias of the spring 46, and therefore the shift lever 20 fixed with the laterally extending portion 38 is prevented from shifting laterally outwardly within the second slot 40. As the operator continues to depress the brake pedal 28, the offset portion 36 shifts further rearwardly until it passes beyond the laterally extending portion 38 of the shift lever 20. At this point the laterally extending portion 38 has sufficient clearance to pivot upwardly within the third slot 42, and the shift lever 20 is allowed to pivot laterally within the second slot 40 under the bias of the spring 46. Therefore, the shift lever 20 will pivot from the neutral mode to the parking mode when the operator depresses the brake pedal 28 beyond an initial range of motion.

The preferred embodiment of the present invention therefore provides a shift lever 20 that is actuated in a longitudinal first direction to shift the transmission 14 between modes, and is shiftable in a transverse second direction for securing the brake 32 in an engaged mode. The provision of a single control for accomplishing both of these functions allows the vehicle 10 to be manufactured with a relatively low number of parts and at a low cost.

I claim:

1. A parking brake mechanism for use with a vehicle having a power source, comprising:
    a transmission means coupled with the power source and having a neutral mode and a plurality of driving modes;
    a shift lever coupled with the transmission and shiftable by the operator in a first direction for selectively shifting the transmission between the neutral mode and the driving modes, said shift lever being shiftable in a second direction;
    a first guide means for guiding the shift lever in the first direction between positions corresponding with the neutral and driving modes;
    brake means for slowing and stopping the vehicle, and having engaged and disengaged modes;
    a brake control engagable by an operator for shifting the brake means between modes;
    a brake linkage extending between the brake control and the brake means for shifting the brake means between modes as the brake control shifts between the engaged and disengaged modes;

a second guide means extending from the shift lever's neutral position and in the second direction; and abutment means formed in the brake linkage, said abutment means being abuttable with a portion of the shift lever when the shift lever has shifted into the second guide means for blocking the brake linkage and brake means from shifting into the disengaged mode.

2. The invention of claim 1, wherein the first guide means blocks the shift lever from shifting in the second direction when the shift lever is in a driving mode.

3. The invention of claim 1, and further comprising a means for biasing the shift lever to shift in the second direction.

4. The invention of claim 1 wherein:
the shift lever pivots about a pivot connection with the vehicle frame; and
a third guide means guides the shift lever into abutment with the abutment means formed in the brake linkage.

5. The invention of claim 1, wherein the second guide means blocks the shift lever from shifting in the first direction when the shift lever is positioned within the second guide means.

6. The invention of claim 1, wherein:
the first guide means extends generally linearly; and
the second guide means is formed integral with and extends generally perpendicularly from the first guide means, said shift lever being shiftable into the second guide means from the neutral position in the first guide means.

7. A parking brake mechanism for use with a vehicle having a power source, comprising:
a transmission means coupled with the power source and having a neutral mode and a plurality of driving modes;
a shift lever coupled with the transmission and shiftable by the operator in a first direction for selectively shifting the transmission between the neutral mode and the driving modes, said shift lever being shiftable in a second direction;
a first slot means for guiding the shift lever in the first direction between positions corresponding with the neutral and driving modes;
brake means for slowing and stopping the vehicle, and having engaged and disengaged modes;
a brake control engagable by an operator for shifting the brake means between modes;
a brake linkage extending between the brake control and the brake means for shifting the brake means between modes as the brake control shifts between the engaged and disengaged modes;
an offset portion formed in the brake linkage;
a second slot means extending in the second direction from the shift lever's neutral position; and
a laterally extending portion coupled with the shift lever, said laterally extending portion being shiftable into abutment with the offset portion of the brake linkage when the shift lever is shifted into the second slot means for blocking the brake linkage from returning to the disengaged mode when the brake control is depressed.

8. The invention of claim 7, wherein the first slot means blocks the shift lever from shifting in the second direction when the shift lever is in a driving mode.

9. The invention of claim 7, and further comprising a means for biasing the shift lever to shift in the second direction.

10. The invention of claim 7, wherein:
the shift lever pivots about a pivot connection with the vehicle frame; and
a third slot means guides the laterally extending portion of the shift lever into abutment with the offset portion of the brake linkage.

11. The invention of claim 7, wherein the second slot means blocks the shift lever from shifting in the first direction when the shift lever is positioned within the second slot means.

12. The invention of claim 7, wherein:
the first slot means extends generally linearly; and
the second slot means is formed integral with and extends generally perpendicularly from the first slot means, said shift lever being shiftable into the second slot means from the neutral position in the first slot means.

13. The invention of claim 7, wherein:
the shift lever is pivotally coupled with the vehicle for pivoting in the first and second directions, said second direction being generally perpendicular to the first direction;
the offset portion extends generally vertically; and
the laterally extending portion pivots generally upwardly into blocking abutment with the offset portion as the shift lever pivots into the second slot means when the brake control is engaged.

14. The invention of claim 7 wherein the brake control further comprises a brake pedal.

15. A parking brake mechanism for use with a vehicle having a power source, comprising:
a transmission means coupled with the power source and having a neutral mode and a plurality of driving modes;
a shift lever pivotally carried by the vehicle and coupled with the transmission, said shift lever being shiftable by the operator in a first direction for selectively shifting the transmission between the neutral mode and the driving modes, said shift lever also being shiftable in a second direction generally perpendicular to the first direction;
a generally linearly extending first slot for guiding the shift lever in the first direction between positions corresponding with the neutral and driving modes, wherein said first slot blocks the shift lever from shifting in the second direction when the shift lever is in a driving mode;
brake means for slowing and stopping the vehicle, and having engaged and disengaged modes;
a brake pedal engagable by an operator for shifting the brake means between modes;
a brake linkage extending between the brake means and the brake pedal for shifting the brake means between modes as the brake pedal shifts between the engaged and disengaged modes, said brake linkage including a generally vertically extending offset portion;
a second slot formed integrally with the first slot and extending in the second direction from the shift lever's neutral position, said second slot being adapted to block the shift lever from shifting in the first direction when the shift lever is positioned within the second slot;
a laterally extending portion coupled with the shift lever, said laterally extending portion being pivotable into abutment with the offset portion of the brake linkage when the brake pedal is depressed and the shift lever is shifted into the second slot for blocking the brake linkage from returning to the disengaged mode;

means for biasing the shift lever to shift in the second direction; and a third slot for guiding the outwardly extending portion of the shift lever into abutment with the offset portion of the brake linkage.

* * * * *